United States Patent [19]

Eggebeen et al.

[11] Patent Number: 5,131,891
[45] Date of Patent: Jul. 21, 1992

[54] HIGHLY DURABLE TAPE CARTRIDGE DRIVE BELT

[75] Inventors: James A. Eggebeen, San Diego; Balramkrishna L. Talwar, San Clemente, both of Calif.; William Y.-C. Cheung, Boston, Mass.

[73] Assignee: Gigatek Memory Systems Limited Partnership, La Costa, Calif.

[21] Appl. No.: 650,305

[22] Filed: Feb. 4, 1991

[51] Int. Cl.$^5$ .................................................. F16G 1/00
[52] U.S. Cl. ...................................................... 474/237
[58] Field of Search .............. 474/237, 260, 264, 268; 242/192; 226/170

[56] References Cited

U.S. PATENT DOCUMENTS

| | | | |
|---|---|---|---|
| 383,373 | 5/1888 | Schieren . | |
| 627,810 | 6/1899 | Rowbatham . | |
| 1,028,783 | 6/1912 | Von Rabenau . | |
| 2,017,291 | 10/1935 | Pfleger | 74/233 |
| 2,295,432 | 9/1942 | Smith | 74/232 |
| 2,342,556 | 2/1944 | Rockoff | 18/59 |
| 2,405,496 | 8/1946 | Gingras | 74/233 |
| 2,782,461 | 2/1957 | Esslinger | 18/6 |
| 3,106,319 | 10/1963 | Fischer | 226/193 |
| 3,141,593 | 7/1964 | Selsted et al. | 226/193 |
| 3,271,229 | 9/1966 | Grabovez | 161/164 |
| 3,305,186 | 2/1967 | Burdorf et al. | 242/55.12 |
| 3,514,049 | 5/1970 | Decker et al. | 242/192 |
| 3,544,038 | 12/1970 | Smith, II | 242/192 |
| 3,643,892 | 2/1972 | Vogel et al. | 242/192 |
| 3,691,268 | 9/1972 | Burkley | 264/162 |
| 3,692,255 | 9/1972 | Von Behren | 242/192 |
| 3,842,152 | 10/1974 | Witfield et al. | 264/210 R |
| 3,891,405 | 6/1975 | Huber | 51/105 R |
| 3,907,230 | 9/1975 | Merle et al. | 242/192 |
| 3,965,764 | 6/1976 | Avramidis | 74/221 |
| 3,980,570 | 8/1976 | Okuda et al. | 252/12.4 |
| 4,062,248 | 12/1977 | Hattendorf | 474/77 |
| 4,270,656 | 6/1981 | Chesmer et al. | 198/847 |
| 4,466,564 | 8/1984 | Smith et al. | 226/170 |
| 4,581,189 | 4/1986 | Smith et al. | 264/131 |
| 4,688,742 | 8/1987 | Hettich | 474/112 X |

FOREIGN PATENT DOCUMENTS 1297446  5/1962  France .

OTHER PUBLICATIONS

Dow Chemical Co., "Product Selector Guide: Pellethane ® Polyurethane Elastomers," Form 306-001-589X SMG, pp. 1-3, 6-8 (Date Unknown).
Dow Chemical Co., "Drying Guide: Pellethane ® Polyurethane Elastomers," Form 3-6-076-589X SMG, p. 1 (Date Unknown).

*Primary Examiner*—Thuy M. Bui
*Attorney, Agent, or Firm*—Brown, Martin, Haller & McClain

[57] ABSTRACT

A highly durable, usually hydrolytically stable, drive belt for belt-driven tape cartridges is disclosed which is a thin continuous flexible loop of at least one polyetherurethane (preferably non-hygroscopic), which is both durable and strong. Preferably the belt will be composed of a composite of two separate polyetherurethane materials, one having a higher molecular weight and longer polymer chain length than the other. Also preferably, these two polyetherurethane materials will be blended to a homogenous mixture by melting both materials and blend the molten material and forming the belt from the resulting polymeric mixture. Optionally a single polyetherurethane polymer may be used as the material comprising the belt if that single material has the requisite properties of flexibility and durability.

24 Claims, No Drawings

HIGHLY DURABLE TAPE CARTRIDGE DRIVE BELT

BACKGROUND OF THE INVENTION

1. Field of the Invention

The invention herein relates to drive belts for belt-driven tape devices, including magnetic tape cartridges.

2. Background of the Invention

Belt driven magnetic tape cartridges have been known for a number of years and are widely used commercially as backup storage devices for computers. Typical cartridges are those shown in U.S. Pat. Nos. 3,305,186; 3,514,049; 3,544,038 and 3,692,255 and French Pat. No. 1,297,446. In such cartridges the magnetic recording tape is driven by a thin continuous flexible belt which is in turn driven by a single reversible drive motor that provides rapid acceleration and deceleration of the recording tape in either direction. The tape used in such cartridges is extremely thin (as thin as 0.4 ml/0.010 mm) and is driven at high speeds (up to 120 inches per second/305 cm per second, or greater) and the data may be recorded on such tape at densites of about 20,000 flux reversals per inch (7900 reversals per cm). At these high tape speeds and recording densities tape-to-head contact and uniformity of tape speed are extremely critical. Such proper tape-to-head contact requires that the transmission of motion by the belt to the tape be uniform and consistent in speed, without significant belt slippage.

In recent years it has become apparent that the types of belts currently used or proposed for use do not provide such uniform motion transfer consistently over extended service lives. To this end, numerous techniques have been proposed to compensate for the belt failures. For instance, U.S. Pat. Nos. 4,466,564 and 4,58,189 disclose belts which have roughened surfaces to prevent tape slippage, U.S. Pat. No. 3,965,764 shows a cartridge utilizing two drive belts, and U.S. Pat. No. 3,305,186 discloses cartridges utilizing dual capstans turning at different speeds to impart tension to the belt. All of these systems, while operable and often used in commercial cartridges, have not completely solved the problem of non-uniform motion transfer to tapes, particularly as the belt ages.

In the past belts have been made of polyester materials, such as "Mylar TM" polyester (U.S. Pat. No. 3,305,186) or polyester polyurethanes (U.S. Pat. No. 4,466,564). While such materials have been considered to be state of the art with respect to belt technology, it has been recognized that they have not been entirely satisfactory and research efforts have been devoted to mechanical means to compensate for the long term loss of tension and increasing slippage common to cartridges using the polyester or polyester urethane belts. Such mechanical compensation, however, adds complexity and cost to cartridges and provides another mechanism within the cartridge which can lead to cartridge failure.

It would therefore be of substantial advantage to have a belt which would maintain long term stability and constant tension during use and which could be readily and inexpensively fabricated.

SUMMARY OF THE INVENTION

The invention herein is a stable and highly durable drive belt for belt-driven recording tape devices which comprises a thin continuous flexible loop of at least one non-hygroscopic polyetherurethane and is both strong and apparently hydrolytically stable. In a preferred embodiment the belt will be composed of a composite of two separate polyetherurethane materials, one having a higher molecular weight and longer polymer chain length than the other. Also preferably, these two polyetherurethane materials will be blended to a homogenous mixture by melting both materials and blend the molten material and forming the belt from the resulting polymeric mixture.

Optionally a single polyetherurethane polymer may be used as the material comprising the belt if that single material has the requisite properties of flexibility and durability.

DETAILED DESCRIPTION AND PREFERRED EMBODIMENTS

The invention herein comprises a novel belt composition which provides a unique combination of strength and durability, and maintains a relatively constant tension in the tape over a long duration. As noted above, in its broadest form the invention herein comprises a drive belt for belt driven recording tape devices which comprises a thin continuous flexible loop of at least one non-hygroscopic polyetherurethane material. The belts of this invention find wide use in the tape cartridge field, as more durable substitutes for the prior art belts (some of which were composed of polyesterurethane material).

A fundamental element in the present invention concerns two related discoveries made by applicants, from which applicants have developed the superior drive belts of the present invention notwithstanding the recognized consensus in the prior art that usable drive belts could not be formed from polyetherurethane materials.

The first of the discoveries made by applicants involves the nature of the breakdown mechanism of prior art polyesterurethane belt materials, which breakdown has severely limited the service life of the polyesterurethane belts. While the mechanism of breakdown has not been fully verified, and therefore is not intended to be limiting of the present invention, applicants from their research believe that the polyesterurethanes exhibit an undue susceptibility to degrading reactions with moisture in the ambient air. It is known that the ester linkage is formed by the condensation reaction of an acid and an alcohol, yielding water as a byproduct This reaction is to some extent reversible, such that ester linkages can react with water, with the ester bond being broken to reform an acid and an alcohol Since a polyesterurethane has a large number of ester linkages throughout the polymer chain, reaction of any one of the ester linkages with ambient moisture will result in a breaking of the chain and the formation of two lower molecular weight, shorter chain polyesterurethanes. Since the strength of drive belts made of polymeric materials is in significant part dependent on the polymer chain length of the polymeric material, significant breaking of the polymer chains leads to degradation of the belt and shortened service life.

The unique and superior nature of a polyetherurethane belt can be recognized from the above analysis. Ether linkages need not be formed by condensation reactions, but rather are often by base catalyzed cleavage of propylene oxide. The opening of the oxirane ring permits catalytic addition of the ether to the anionic end of a polymer chain and formation of a new anion, which in turn is catalytically reacted with the next successive open oxirane ring. Since the cleavage of an oxirane ring is essentially a non-reversible reaction in the absence of catalysts, there is essentially no tendency for either linkages in the polyetherurethanes to break and degrade the polymer in the presence of ambient air or moisture. Thus, for the purposes of the present invention the polyetherurethanes which comprise the belts of the present invention can be considered to be non-hygroscopic and the resulting belts therefore are believed to be hydrolytically stable under ambient conditions.

The second discovery by applicants which is integral to the present invention involves the recognition of polyetherurethane properties which are critical to the satisfactory performance of a belt and how to obtain those properties in a polyetherurethane material. Those skilled in the art of belt manufacture and performance in the past have believed that polyetherurethane materials were unsuitable for belts because they lacked the proper degree of flexibility or durability. Some materials previously examined had insufficient flexibility and, while having high strength and resistance to ambient moisture, therefore proved to be very short lived, since the rapid and continual bending and flexing required of a belt in its serpentine path through a tape cartridge very quickly caused extensive physical damage to the low flexibility belts. Other polyetherurethane materials, conversely, were found to have excessive flexibility (i.e. be "springy") and therefore, while quite durable, did not have the ability to impart constant motion at the drive point of the tape reel in a tape cartridge. Accordingly, polyetherurethanes were considered to be unusable as belts by the prior art.

As part of this invention applicants have determined the requisite properties necessary for a polyetherurethane drive belt which has both proper flexibility and superior durability, and have successfully fabricated appropriate polyetherurethane materials and successfully formed superior drive belts from such materials. Applicants have herein discovered that if the polyetherurethane material is formed with an average intermediate length polymer chain, it will exhibit neither the stiffness and lack of durability of low molecular weight polyetherurethanes nor the excessive springiness of the high molecular weight polyetherurethanes. For the purposes of this invention, therefore, the suitable polyetherurethanes will preferably have molecular weights in the range of from 125,000 to 300,000 and will exhibit the requisite properties described below (All molecular weights herein are weight average unless otherwise noted.) Either a single type of polyether urethane may be used or, preferably, a composite polyetherurethane material may be synthesized by the combination of a higher molecular weight polyetherurethane with a lower molecular weight polyetherurethane, such that the resulting composite has a weighted average intermediate molecular weight within the above range. It would also be possible to form the intermediate range synthesized polyurethane material by admixture of three or more polyetherurethane materials of varying molecular weights In this invention, however, it is preferred that the polyetherurethane material which comprises the belt be formed of two separate polyetherurethane materials, one with substantially greater molecular weight and longer chain length than the other. It has been found, for instance, that superior materials are formed where one of the materials has a molecular weight in the range of 125,000-200,000 and the other has a molecular weight in the range of 200,000-300,000.

The admixture or combination of the two polyetherurethanes may be accomplished in a variety of ways to form the composite material from which the belt loops are cut Successful belts have been formed from laminated composite polyetherurethane materials in which a layer of one polyetherurethane is laminated to a layer of a different polyetherurethane material, with the loops for the belts being cut from the laminated sheets. The sheets may be bonded by heat or by a suitable adhesive, such that the belts do not suffer delamination in service More preferably, however, the two materials are melted and blended in the molten state to form a homogenous mixture which is cooled to form a sheets of polymeric material with the appropriate intermediate molecular weight and where the two disparate materials in effect combine synergistically to provide the appropriate properties of flexibility and durability than neither individually possesses. Belt loops may be then readily cut from the resultant sheets.

The belts of this invention have been tested in several different types of conventional tape cartridges including those described in the background section of this application. In all cases the test belts were found to provide proper tensioning and maintain constant drive speed at the driving point on the tape reel in a manner equal or superior to that of the prior art belts. In addition, the belts of this invention exhibited low creep and no susceptibility to ambient moisture over prolonged test periods. The belts commonly have coefficients of elasticity of about 0.01–0.25 m/N-m, and are normally pretensioned to at least about 1.6N.

These results are exemplified by the following data. The test samples belts were 1) polyesterurethane belts in belt-driven commercially available magnetic tape cartridges of the type defined in ANSI Standard X3B5/87-217; these cartridges are commonly referred to as "streaming tape cartridges" and are generally similar to the cartridge shown in the aforementioned U.S. Pat. No. 3,692,255, and 2) the polyetherurethane belts of this invention, used to drive equivalent tape cartridges. Specifically, the sample belts of this invention were cut from sheets formed from a molten 1:1 mixture of a high molecular weight (about 260,000 m.w.) polyetherurethane ("Pellethane" TM polyetherurethane no. 2103-90AEF from the Dow Chemical Company) and a low molecular weight (approximately 160,000 m.w.) polyetherurethane ("Estane" TM Compound 58887 from the B.F. Goodrich Chemical Group).

Various properties are compared First, the "short cycle life" was tested. In this test, one first writes a tape entirely full, so that all (normally 29) tracks are fully written. The tape is then positioned to the center of a track and a single block (normally a few inches of tape) is repetitively read and tested for errors. After each fifty successive read passes of the same block, the cartridge is cycled one full pass and the test is recommenced. This test repeats with a full tape read being inserted every fifteen retentions to test for errors before and after the single block test. The commercial polyesterurethane belts normally ran for about 40,000 passes before developing significant increases in error rate, while the polyetherurethane belts of this invention ran for about 120,000 passes before significantly increasing the error rate. Thus the belts of this invention surpassed the performance of the commercial prior art belts by a factor of three.

In an associated test, one writes one block of tape at a time and each block is immediately re-read. This imposes a cyclic tape motion of 1-2 inches forward and backward, repeated for thousands of times In such tests competitive belts produced increasing error rates at significant lower numbers of cycles than did the belts of this invention.

Two other tests, also defined in the aforesaid ANSI Standard, measure tape tension and tangential drive force applied to the capstan to drive the tape, at different numbers of passes of the tape. In the tape tension test, the standard range for acceptable performance is 1.0-3.5 ounces (force) of tension. Cartridges are measured for maximum, average and minimum tape tension Commercial tapes (10 samples) at 0 passes (new belts and tapes) produced average values respectively of 1.6, 2.0 and 2.5 oz; "industry standard" tapes, i.e., specially made non-commercial items (10 samples), produced values of 2.4, 2.6 and 3.3 oz; and tapes of this invention (20 samples) produced 1.9, 2.4 and 3.1 oz. It will be evident that the tapes and belts of this invention thus significantly outperformed the commercial tapes and belts and closely approached the performance of the special "standard" products.

It will be evident that there are numerous embodiments of this invention which, while not individually discussed above, are clearly within the scope and spirit of the invention. Therefore, the above description is to be considered exemplary only and the scope of the invention is to be limited solely by the appended claims.

We claim:

1. A drive belt for belt driven recording tape devices which comprises a thin, continuous flexible loop of at least one polyetherurethane material.

2. A belt as in claim comprising a polyetherurethane material having a molecular weight in the range of 125,000 to 300,000.

3. A belt as in claim 1 comprising a composite polyetherurethane material formed from a plurality of cooperative polyetherurethane polymers.

4. A belt as in claim 3 wherein said plurality of polymers are separate materials and are bonded together to form said loop comprising said belt.

5. A belt as in claim 3 wherein said plurality of polymers are formed into a physical mixture and said loop is formed from said mixture.

6. A belt as in claim 3 wherein said polymers are first melted and the molten polymers are formed into a substantially homogeneous mixture from which said loop is formed.

7. A belt as in claim 3 wherein there are two polyetherurethane polymers and one of said polyetherurethane polymers has a significantly lower polymer molecular weight than the other.

8. A belt as in claim 7 wherein one of said polymers has a molecular weight of in the range of 125,000-200,000 and the other has a molecular weight in the range of 200,000-300,000.

9. A belt as in claim 8 wherein one of said polymers has a molecular weight of approximately 160,000 and the other has a molecular weight of approximately 260,000.

10. A belt as in claim 9 wherein said polymers are first melted and the molten polymers are formed into a substantially homogeneous mixture from which said loop is formed.

11. A belt as in claim 3 having a coefficient of elasticity of about 0.01-0.25 m/N-m.

12. A belt as in claim 3 having a pretension of at least about 1.6N.

13. A hydrolytically stable drive belt for belt driven recording tape devices which comprises a thin, continuous flexible loop of at least one non-hygroscopic polyetherurethane material.

14. A belt as in claim 13 comprising a polyetherurethane material having a molecular weight in the range of 125,000 to 300,000.

15. A belt as in claim 13 comprising a composite polyetherurethane material formed from a plurality of cooperative polyetherurethane polymers.

16. A belt as in claim 15 wherein said plurality of polymers are separate materials and are bonded together to form said loop comprising said belt.

17. A belt as in claim 15 wherein said plurality of polymers are formed into a physical mixture and said loop is formed from said mixture.

18. A belt as in claim 15 wherein said polymers are first melted and the molten polymers are formed into a substantially homogeneous mixture from which said loop is formed.

19. A belt as in claim 15 wherein there are two polyetherurethane polymers and one of said polyetherurethane polymers has a significantly lower polymer molecular weight than the other.

20. A belt as in claim 19 wherein one of said polymers has a molecular weight of in the range of 125,000-200,000 and the other has a molecular weight in the range of 200,000-300,000.

21. A belt as in claim 20 wherein one of said polymers has a molecular weight of approximately 160,000 and the other has a molecular weight of approximately 260,000.

22. A belt as in claim 21 wherein said polymers are first melted and the molten polymers are formed into a substantially homogeneous mixture from which said loop is formed.

23. A belt as in claim 15 having a coefficient of elasticity of about 0.01-0.25 m/N-m.

24. A belt as in claim 15 having a pretension of at least about 1.6N.

* * * * *